United States Patent
Yu et al.

(10) Patent No.: US 6,814,596 B2
(45) Date of Patent: Nov. 9, 2004

(54) CARD CONNECTOR HAVING LOW PROFILE AND VISION INDICATOR

(75) Inventors: Zhi Nong Yu, Kunsan (CN); Lun Song Hu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/299,261

(22) Filed: Nov. 18, 2002

(65) Prior Publication Data

US 2004/0014342 A1 Jan. 22, 2004

(30) Foreign Application Priority Data

Jul. 18, 2002 (TW) ...................................... 91210912 U

(51) Int. Cl.[7] .............................................. H01R 13/62
(52) U.S. Cl. ..................................... 439/159; 439/946
(58) Field of Search ................................ 439/159, 160, 439/946

(56) References Cited

U.S. PATENT DOCUMENTS

| | | | |
|---|---|---|---|
| 6,332,790 B1 | * | 12/2001 | Ishikawa et al. ............ 439/157 |
| 6,655,972 B2 | * | 12/2003 | Sato ............................ 439/159 |
| 6,663,403 B2 | * | 12/2003 | Hsu ............................. 439/159 |
| 2001/0055896 A1 | | 12/2001 | Takada et al. |
| 2001/0055897 A1 | | 12/2001 | Nogami |
| 2002/0127899 A1 | * | 9/2002 | Ikeda et al. .................. 439/159 |
| 2003/0032317 A1 | * | 2/2003 | Coya et al. .................. 439/159 |

* cited by examiner

*Primary Examiner*—Hae Moon Hyeon
(74) *Attorney, Agent, or Firm*—Wei Te Chung

(57) ABSTRACT

A card connector (1, 1') includes an insulative housing (2, 2') defining a card receiving space (23, 23'), a number of contacts (3, 3') retained in the housing, a metal shell (4, 4') shielding the contacts, and an elastic locking piece (8, 8'). The elastic locking piece includes a locking portion (83, 83') and a protruding portion (82, 82'). The metal shell defines a guide hole (41, 41') for guiding the displacement of the protruding portion. When the elastic locking piece is biased by an inserted card (10) having a notch (18) before the locking portion engages with the notch during an earlier card insertion operation, the protruding portion is displaced in a first direction. When the locking portion engages with the notch during a later card insertion operation, the protruding portion moves in a second direction opposite to the first direction.

17 Claims, 15 Drawing Sheets

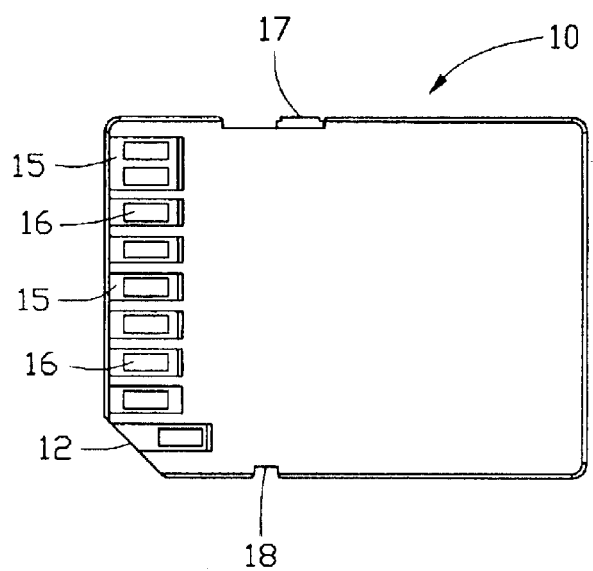
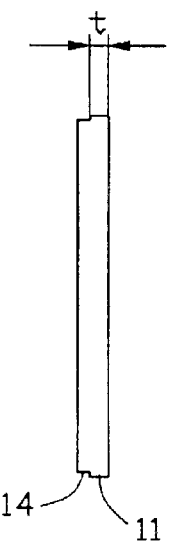
FIG. 1A    FIG. 1B
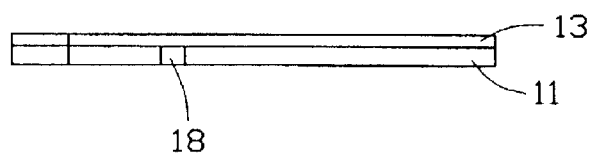
FIG. 1C

CARD CONNECTOR HAVING LOW PROFILE AND VISION INDICATOR

BACKGROUND OF THE INVENTION

1. Filed of the Invention

The present invention relates to a card connector, and more particularly to a low profile card connector capable of reliably holding an inserted card.

2. Description of the Prior Art

In electronic devices such as cellular phones, telephones, Personal Digital Assistants (PDA) and digital cameras, a variety of functions are added by inserting an IC (integrated circuit) card with a built-in CPU or memory IC, such as a SIM (subscriber identity module) card, an MMC (multimedia card), an SD (secure digital) card, an MS (Memory Stick) and an SM (Smart Media) card.

Card connectors are provided for connecting such cards to circuit boards of the electronic devices. U.S. Patent Application Publication No. 2001/0055897 A1 discloses a card connector for selectively accommodating a first card defining a retention notch and a second card without a retention notch. The conventional card connector comprises a case retaining a plurality of terminals for electrically connecting with contact pads of the first or the second card. In one embodiment as disclosed in FIGS. 25–27 of the '897 A1 publication, the case is made of insulative material and has an elongate raised portion 88. The card connector has a slider for removing an inserted card. The slider has a card retaining arm 85 guided by the raised portion 88 for retaining the inserted card and thereby preventing the inserted card from falling out of the connector.

When the first card having a retention notch is inserted into the card connector, the raised portion 88 guides the card retaining arm 85 along an inner side thereof and prevents the card retaining arm 85 from moving outwardly, thereby securely retaining the inserted first card. When the second card without a retention notch is inserted into the card connector, the card retaining arm 85 is displaced outwardly to move along an outer side of the raised portion 88. Therefore, the raised portion 88 functions as a guide means for guiding the movement of the card retaining arm 85.

However, in order to restrict the outward movement of the card retaining arm 85, the raised portion 88 has a relatively high height. The profile of the case is increased because of the provision of the raised portion 88. As a result, the case having a high profile occupies relatively large space of an electrical device. Furthermore, since a large amount of friction force is exerted on the raised portion 88 made of insulative material, the insulative raised portion 88 tends to be abraded after a long term of use, resulting in an improper guidance of the card retaining arm 85 and an unreliable retaining of the inserted card.

To solve the above-mentioned problem, in another embodiment of the conventional card connector, the raised portion 88 is replaced by an elongate groove defined in the case. When the first card is inserted, the card retaining arm 85 moves into the elongate groove and is prevented from outwardly moving. When the second card is inserted, the card retaining arm 85 slides on a step-down portion of the case. However, the card retaining arm 85 moves along different planes when the first or the second card is inserted into the card connector, resulting in a fluctuating movement of the retaining arm 85. After a long period of use, the card retaining arm 85 tends to separate from the slider, resulting in an unreliable retaining of the inserted first or the second card. Furthermore, the provision of the elongate groove in the case weakens the intensity of the case, resulting in a short life-span thereof.

It is well known that a card has a chamfered corner for preventing an erroneous insertion thereof into a card connector. However, the conventional card connector cannot prevent an erroneous card insertion until a large portion of the card has been inserted into the connector. Such an erroneous engagement between the large portion of the card and the connector still may cause harm to both the card and the connector.

Hence, an improved card connector is desired to overcome the above-mentioned shortcomings.

BRIEF SUMMARY OF THE INVENTION

A main object of the present invention is to provide a low profile card connector capable of reliably holding an inserted card in a compact manner.

Another object of the present invention is to provide a card connector which is robust and durable.

A further object of the present invention is to provide a card connector capable of preventing an erroneous insertion of a card thereinto at an early stage of insertion of the card.

A card connector in accordance with the present invention is provided to accept a card having a notch in its side edge. The card connector comprises an insulative housing, a plurality of contacts retained in the housing, an eject mechanism mounted on the housing, an elastic locking piece and a metal shell. The insulative housing defines a card receiving space for receiving the card. The eject mechanism comprises an eject member for moving in a card insertion/ejection direction in response to the card insertion/ejection operation. The elastic locking piece is attached to the eject member and is moved as the eject member moves in the card insertion or ejection direction. The elastic locking piece comprises a locking portion for engaging with the notch of the card, a stationary portion fixed in the eject member, and a protruding portion projecting from the locking portion. The metal shell substantially covers the housing and defines a guide hole. The guide hole is provided to accommodating and guiding the protruding portion of the elastic locking piece.

When the elastic locking piece is biased by the card before the locking portion engages with the notch during an earlier card insertion operation, the protruding portion is displaced in a first direction. When the locking portion engages with the notch during a later card insertion operation, the protruding portion moves in a second direction opposite to the first direction.

The guide hole is defined in the metal shell without increasing the profile of the card connector and without affecting the intensity of the housing. Therefore, the card connector of the present invention has a low profile and a relatively long life-span, and is also capable of reliably holding the inserted card.

Other objects, advantages and novel features of the invention will become more apparent from the following detailed description when taken in conjunction with the accompanying drawings.

BRIEF DESCRIPTION OF THE DRAWINGS

FIGS. 1A, 1B and 1C are a bottom view, a front view and a side view of a two-stage thickness card, respectively.

DETAILED DESCRIPTION OF THE INVENTION

Figures 2A, 2B:
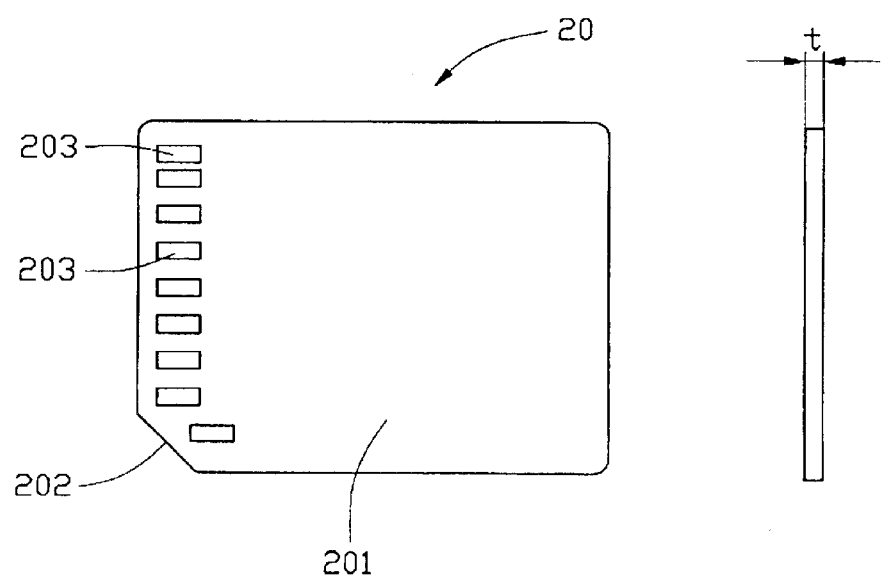
FIGS. 2A and 2B are a bottom view and a front view of a one-stage thickness card, respectively.
Figure 3:
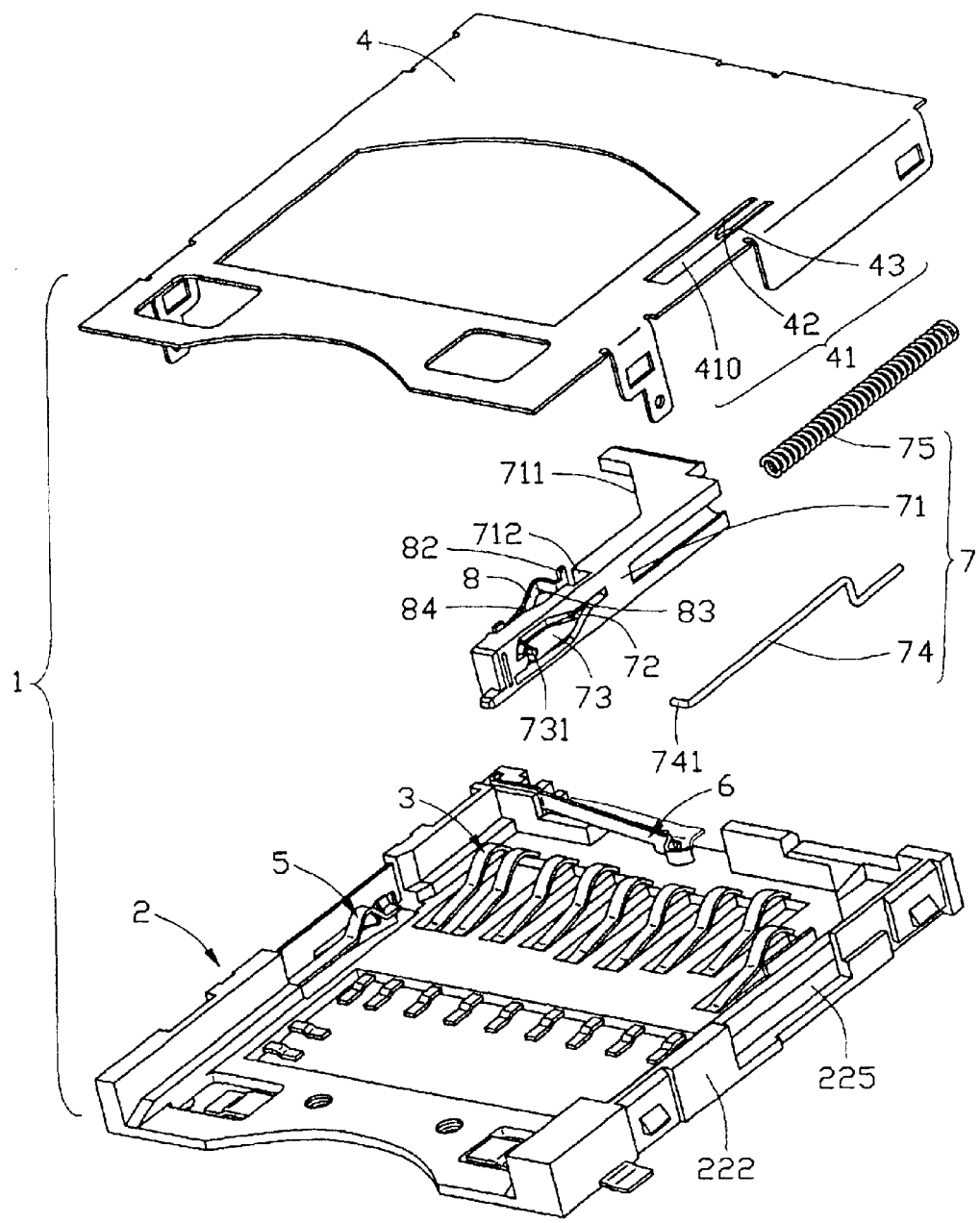
FIG. 3 is an exploded view of a card connector according to a first embodiment of the present invention.
Figure 4:
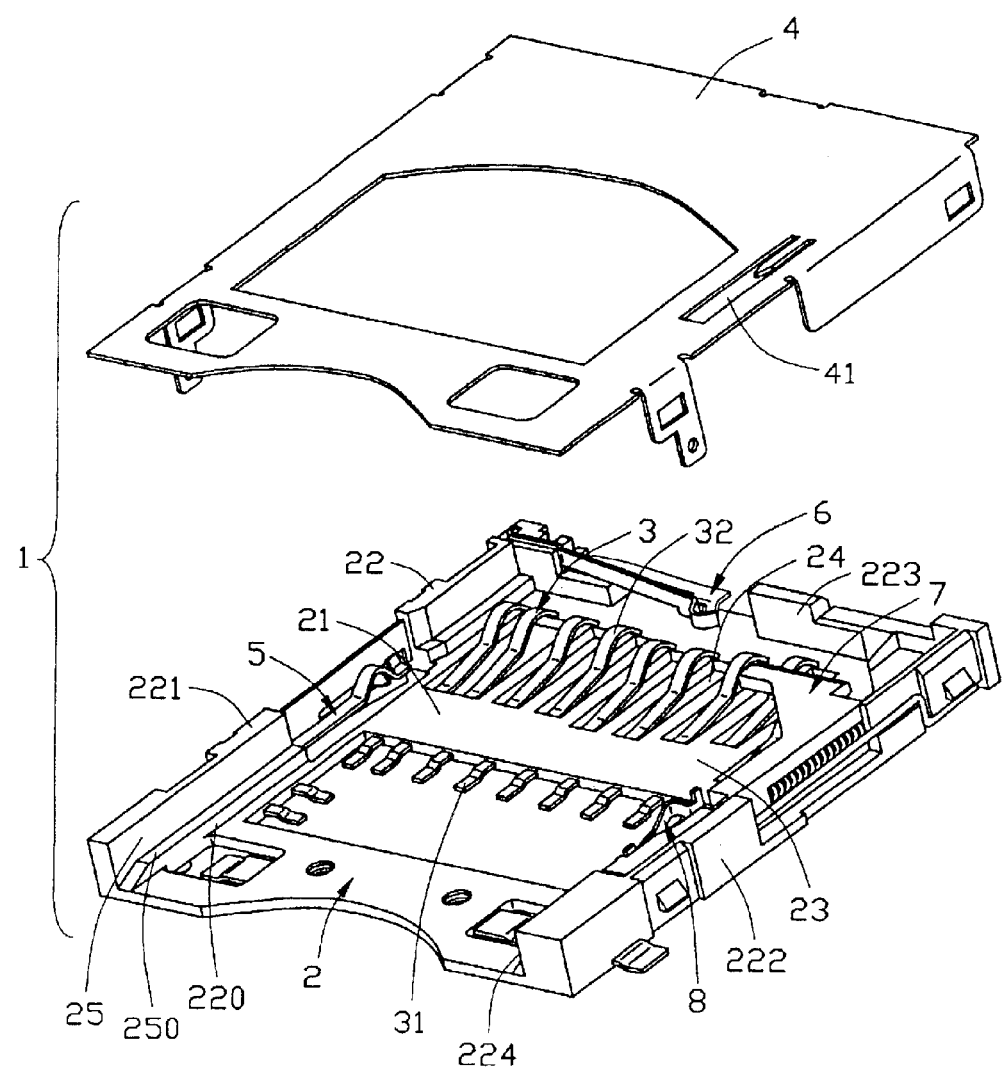
FIG. 4 is a partially assembled view of FIG. 3.
Figure 5:
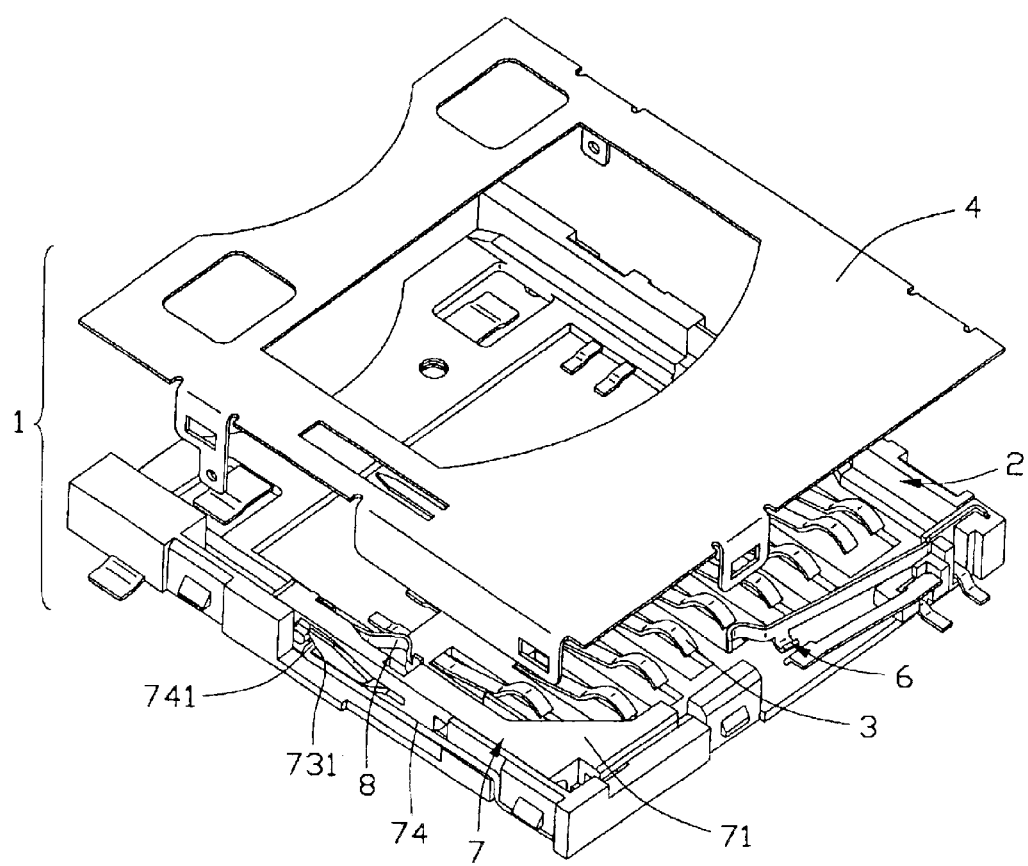
FIG. 5 is another partially assembled view of FIG. 3, with an eject mechanism thereof in a locking state.
Figure 6:
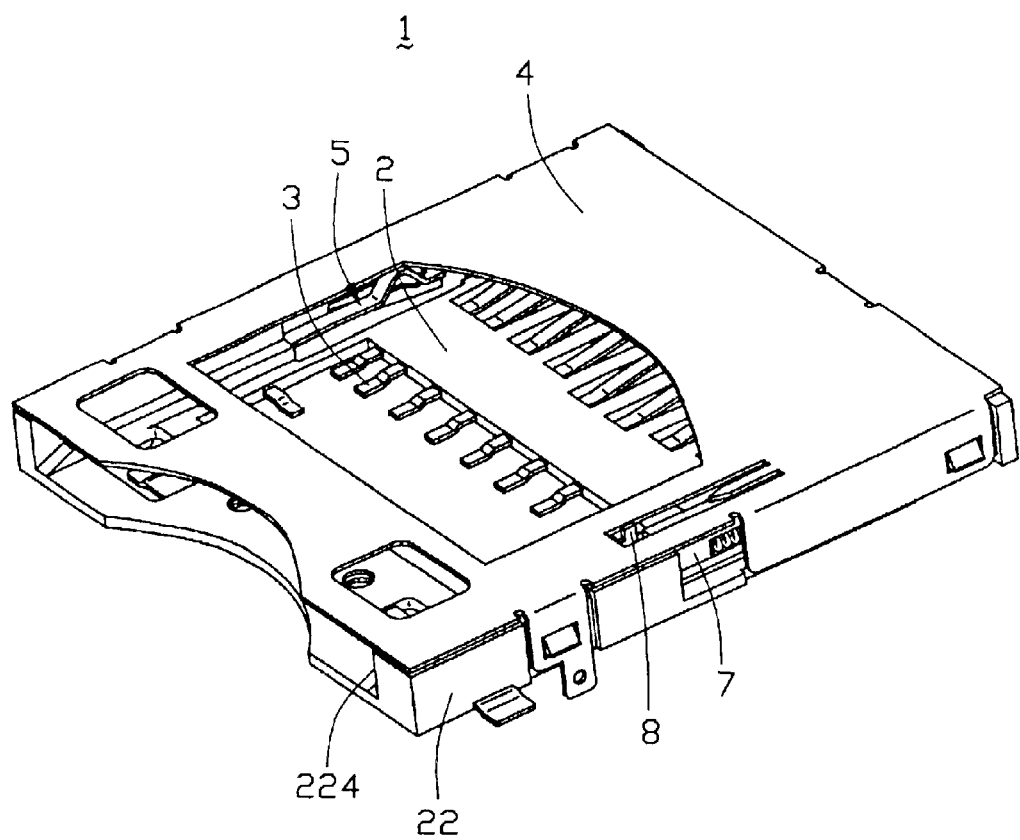
FIG. 6 is an assembled view of FIG. 3.

Referring to FIG. 3, a card connector 1 according to a first embodiment of the present invention is shown to selectively receive a two-stage thickness card 10 (FIGS. 1A–1C) or a one-stage thickness card 20 (FIGS. 2A, 2B).

Referring to FIGS. 1A, 1B and 1C, the two-stage thickness card 10, used for a secure digital (SD) card, has an upper body portion 11 with a thickness "t", and a chamfer 12 at its left, front corner to prevent an erroneous insertion of the card into a card connector. A lower body portion 13 opposite to the upper body portion 11 is slightly narrower than the upper body portion 11. That is, the card 10 has a two-stage structure by which a stepped side surface 14 is formed on each lateral side of the card 10. The lower body portion 13 has a plurality of recessed portions 15 adjacent to its front end, on the bottom surfaces of which a plurality of contact pads 16 are arranged to connect with an integrated circuit in the card. The card 10 has a write protect switch 17 on one side thereof. A notch 18 is defined in the other side of the upper body portion 11 of the card 10. The notch 18 is used to lock the card 10 in a card connector when the card 10 is correctly inserted therein.

Referring to FIGS. 2A and 2B, the one-stage thickness card 20, used for a multimedia card (MMC), has a card body 201 with a thickness "t" equal to that of the upper body portion 11 of the two-stage thickness card 10. The one-stage thickness card 20 also has a chamfer 202 at its left, front corner to prevent an erroneous insertion thereof into a card connector. A plurality of contact pads 203 are arranged on the bottom surface of the one-stage thickness card 20 adjacent to the front end thereof.

The configuration of the one-stage thickness card 20 is similar to that of the two-stage thickness card 10.

Referring to FIGS. 3–6, the card connector 1 comprises an insulative housing 2, a plurality of conductive contacts 3 retained in the housing 2, a metal shell 4 substantially covering the housing 2, a protection-detecting switch 5, an end position switch 6, an eject mechanism 7 and an elastic locking piece 8.

The insulative housing 2 comprises a base plate 21 and a U-shaped peripheral frame 22 substantially surrounding the base plate 21. The base plate 21 of the housing 2 defines a plurality of holes 24 into which the front ends of elastically deformed contacts 3 extend when the card 10 or 20 is inserted into the connector 1. The U-shaped peripheral frame 22 comprises three rims 221, 222 and 223 interconnecting end-to-end and upwardly extending from the respective left, right and front sides of the base plate 21. Thus, a card receiving space 23 is defined by the frame 22 and the base plate 21. The U-shaped peripheral frame 22 has a rear opening 224, through which the card 10 or 20 is inserted into the card receiving space 23. The right rim 222 defines a guide recess 225 (FIG. 3). A pair of guide grooves 25 are respectively defined in the left and right rims 221 and 222. Each groove 25 forms a bottom wall 250 to support and guide the upper body portion 11 of the two-stage thickness card 10, or the one-stage thickness card 20. Side walls 220 of the rims 221, 222 guide the side surfaces of the lower body portion 13 of the two-stage thickness card 10.

The contacts 3 are secured to the base plate 21 of the housing 2. Each contact 3 has a tail portion 31 provided to be soldered to an associated contact pad formed on a printed circuit board in an electronic device (not shown), a stationary portion (not shown) secured to the base plate 21 of the housing 2, and a cantilevered spring contact portion 32 protruding upwardly into the card receiving space 23 to make a resilient engagement with a corresponding contact pad 16 (203) of the card 10 (20).

As shown in FIG. 3, the metal shell 4 defines a generally Y-shaped guide hole 41 in a middle of a right side of an upper wall thereof. The guide hole 41 is used for guiding movement of a protruding portion 82 of the elastic locking piece 8 in response to the insertion of the different cards 10, 20 into the connector 1. The guide hole 41 comprises a slot 410 defined in a rear portion thereof. The guide hole 41 further comprises a first and a second guide slits 42, 43 forwardly extending from the slot 410 in two parallel branches. The slits 42, 43 are separated from each other by a partition (not labeled) formed by the upper wall of the metal shell 4.

The protection-detecting switch 5 is mounted in the left rim 221 for detecting if the protect switch 17 of the inserted card 10 is in a write-protect position. The protection-detecting switch 5 is disclosed in co-pending U.S. patent application Ser. No. 09/876,770, filed on Jun. 6, 2001 and assigned to the same assignee as the present invention. The whole disclosure of the '770 application is incorporated herein by reference.

The end position switch 6 is mounted in the front rim 223 for detecting full insertion of the card 10 or 20. The end position switch 6 is disclosed in co-pending U.S. patent application Ser. No. 09/811,127, filed on Mar. 16, 2001 and assigned to the same assignee as the present invention. The whole disclosure of the '127 application is also incorporated herein by reference.

Particularly referring to FIG. 3, the eject mechanism 7 is mounted in the right rim 222 for ejecting the inserted card 10 or 20 when the inserted card 10 or 20 is pushed slightly toward the front rim 223 of the housing 2. The eject mechanism 7 comprises an eject member 71, a cam lever 74 and a coil spring 75. The eject member 71 is slideably mounted in the guide recess 225 of the right rim 222 to perform an eject operation. The eject member 71 has a card abutment portion 711, a lever guide groove 72 and a heart cam 73. The card abutment portion 711 is provided for engaging with the chamfer 12 or 202 and the front end of the card 10 or 20. The cam lever 74 is supported by the right rim 222 with a free end 741 thereof movably fitted in the lever guide groove 72. The eject member 71 defines a receiving groove 712 in an inner side thereof. The coil spring 75 has a rear end received in the eject member 71, and a front end for abutting against the front rim 223.

When the card 10 or 20 is inserted into the connector 1, the eject member 71 is pushed by the card 10 or 20 to move toward the front rim 223 of the connector 1. At this time, the free end 741 of the cam lever 74 moves along the lever guide groove 72 until it is locked by a locking portion 731 of the heart cam 73 (shown in FIG. 5). As a result, the card 10 or 20 is fully inserted in the connector 1, with the contacts 3 of the connector 1 engaging with contact pads 16 or 203 of the card 10 or 20.

When the card 10 or 20 is to be ejected, the inserted card 10 or 20 is slightly pushed forwardly. As a result, the free end 741 of the cam lever 74 is unlocked from the locking portion 731 of the heart cam 73. When the slightly pushing force is released, the eject member 71 is pushed by the compressed coil spring 75 rearwards. The free end 741 of the cam lever 74 moves along the lever guide groove 72 to reach a foremost end of the groove 72. The inserted card 10 (20) is ejected by the abutment portion 711 of the eject member 71.

The elastic locking piece 8 is secured to the eject member 71 and is formed of an elastically deformable material such as metal or plastics. As clearly shown in FIGS. 3 and 7, the elastic locking piece 8 comprises a fixing portion (not shown) at a rear end thereof secured to the eject member 71, a spring portion 84 extending forwardly from the fixing portion, and a hook-shaped locking portion 83 forwardly extending from the spring portion 84 and projecting inwardly into the card receiving space 23. The locking portion 83 fits into the notch 18 of the two-stage thickness card 10 when the card 10 is correctly into the connector 1. A protruding portion 82 projects upwardly from a distal end of the locking portion 83.

In use, the first and second guide slits 42 and 43 of the metal shell 4 are provided to accommodate and guide the protruding portion 82 of the elastic locking piece 8 as the eject member 71 moves. The first guide slit 42 functions for guiding the protruding portion 82 of the elastic locking piece 8 when the two-stage thickness card 10 in inserted/ejected into/from the connector 1. When the one-stage thickness card 20 is inserted/ejected into/from, the second guide slit 43 guides the protruding portion 82 of the locking piece 8.

Figure 7:
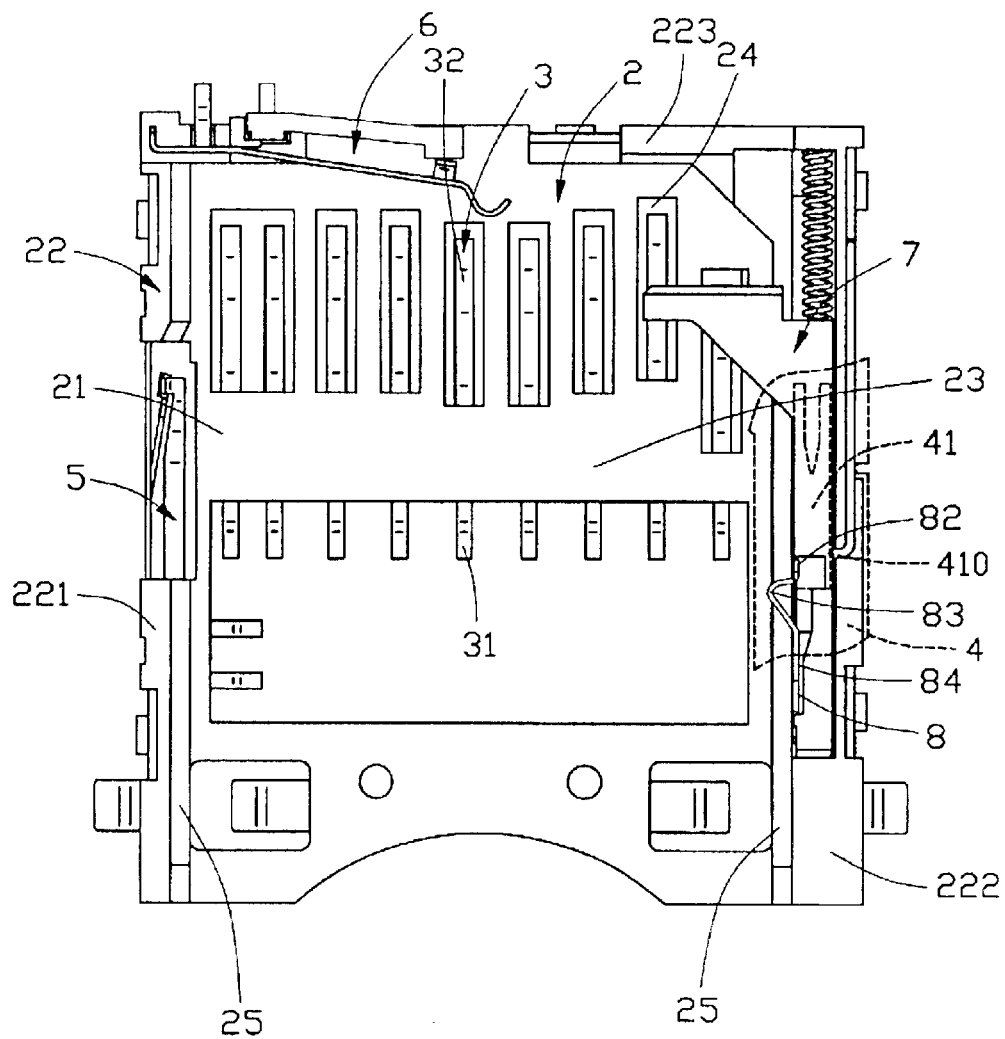
FIG. 7 is a top view of FIG. 6, but only showing a part of a metal cover (in dashed line) of the connector attached on a housing thereof for clarity.

Particularly referring to FIG. 7, for the connector structure described above, when no card is inserted, the locking portion 83 of the elastic locking piece 8 projects into the card receiving space 23, and the protruding portion 82 projects through the guide hole 41 of the metal shell 4 (dashed line) and abuts against an inner side of the slot 410.

Figure 8:
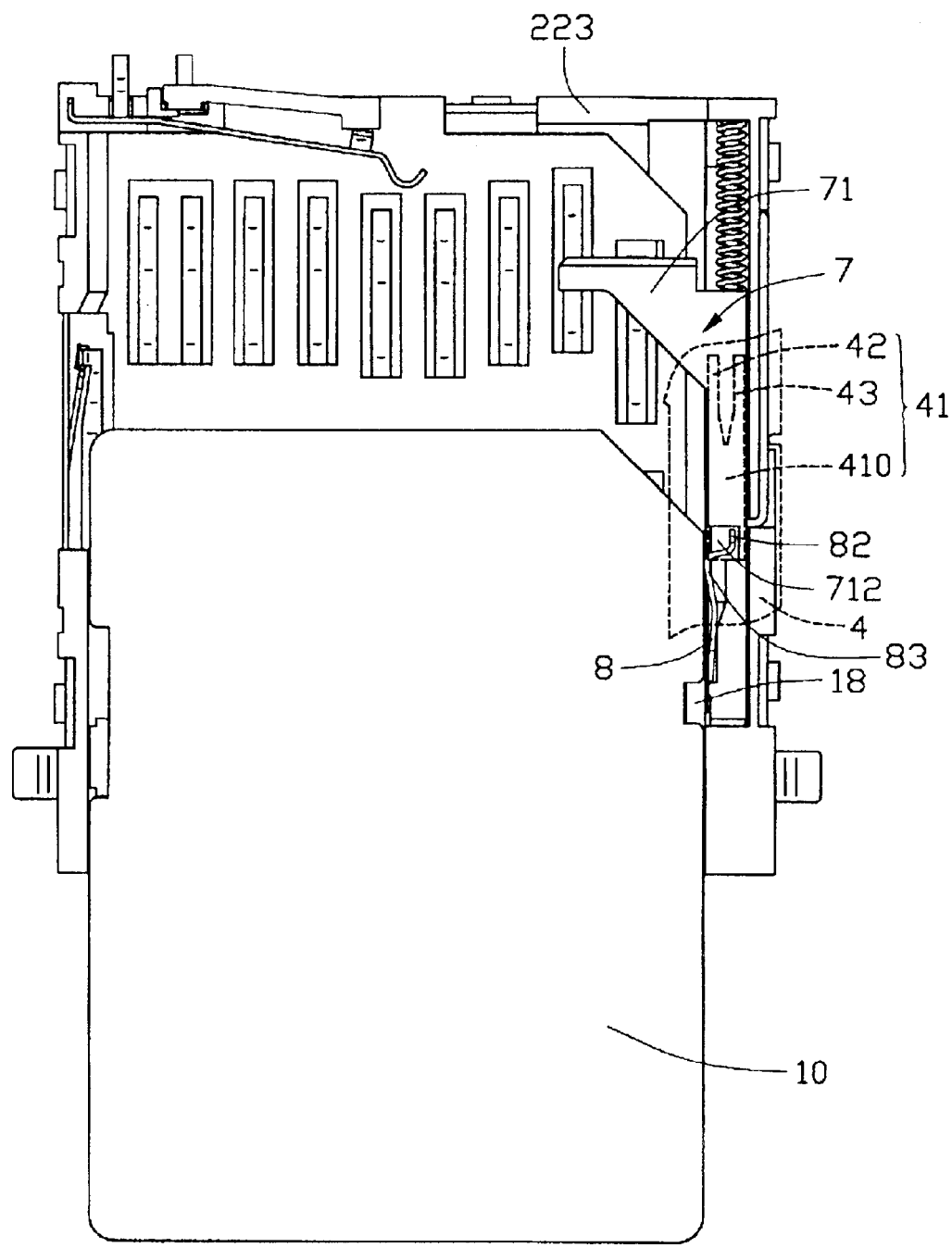
FIG. 8 is a view similar to FIG. 7, but with the two-stage thickness card partially inserted before a notch thereof engages with a locking portion of an elastic locking piece of the connector.

Referring to FIG. 8, when the two-stage thickness card 10 is inserted, the elastic locking piece 8 is primarily biased into the receiving groove 712 by a side surface of the inserted card 10 with the protruding portion 82 displaced widthways of the housing 2 to an outer portion of the slot 410 before the notch 18 of the card 10 engages with the locking portion 83.

Figure 9:
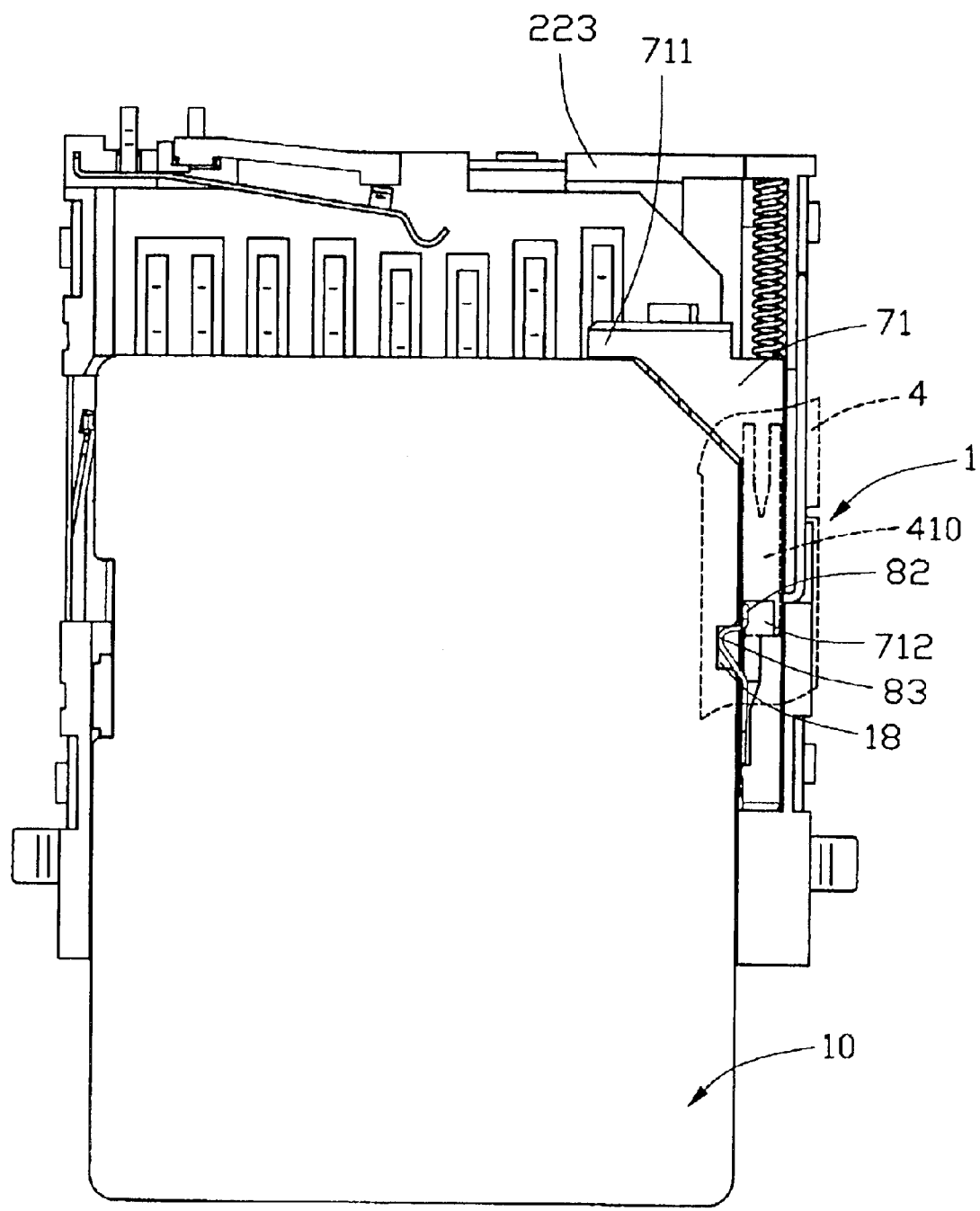
FIG. 9 is a view similar to FIG. 8, but with the notch of the two-stage thickness card engaged with the locking portion of the elastic locking piece.

Referring to FIG. 9, when the front end of the card 10 abuts against the card abutment portion 711 of the eject member 71 as the two-stage thickness card 10 keeps on moving toward the front rim 223 of the housing 2, the locking portion 83 of the elastic locking piece 8 moves inwardly into the notch 18 of the card 10 and the protruding portion 82 is displaced widthways of the housing 2 to an inner portion of the slot 410 by elastic recovery force of the elastic locking piece 8.

Figure 10:
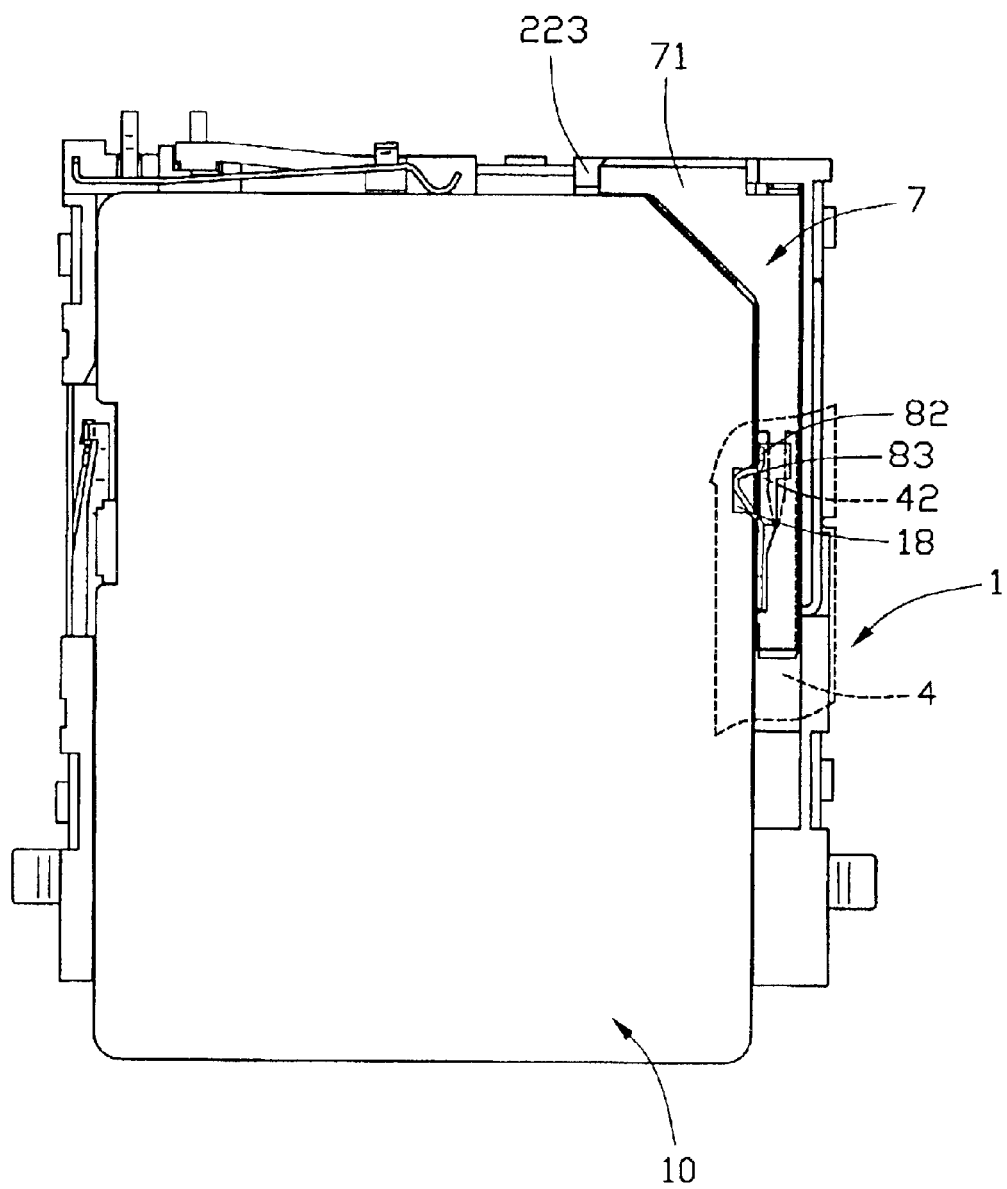
FIG. 10 is a view similar to FIG. 9, but with the two-stage thickness card fully inserted.

Referring to FIG. 10, the eject member 71 is pushed by the front end of the card 10 toward the front rim 223 of the housing 2 until the card 10 is fully inserted. The movement of the eject member 71 causes the elastic locking piece 8 to also move forwardly. As a result of this motion, the protruding portion 82 of the elastic locking piece 8 forwardly moves along the first guide slit 42 of the guide hole 41. The first guide slit 42, therefore, functions as an accommodate means for allowing movement of the protruding portion 82 of the elastic locking piece 8 after the notch 18 of the card 10 engages with the locking portion 83.

In the full insertion position of the card 10, because the protruding portion 82 of the elastic locking piece 8 is restricted by the first guide slit 42 of the guide hole 41 formed in the metal shell 4, the locking portion 83 of the elastic locking piece 8 is kept in engaging with the notch 18 of the card 10 to lock the card 10 in position. In this locked state, the hook-shaped locking portion 83 engages with the notch 18 of the card 10 and totally blocks the movement of the card 10 in the retraction direction. Hence, the card 10 can be prevented from falling out due to unexpected external force, whereby a reliable electrical connection between the card 10 and the connector 1 is ensured.

As described above, after the card 10 is fully inserted into the connector 1, and when an eject operation of pushing the inserted card 10 toward the front rim 223 is carried out, the eject mechanism 7 is unlocked, allowing the eject member 71 to be moved rearwardly by the recovery force of the coil spring 75. The rearward movement of the eject member 71 causes the card 10 and the elastic locking piece 8 to move rearwardly. Thus, the protruding portion 82 of the elastic locking piece 8 slides along the first guide slit 42 of the guide hole 41 in a direction reverse to the card insertion direction. As a result, the protruding portion 82 leaves the first guide slit 42 and into slot 410. As a result, the locking portion 83 unlocks the card 10, whereby the card 10 is free from the locking of the elastic locking piece 8. When the card 10 is removed from the connector 1, the locking portion 83 of the elastic locking piece 8 projects into the card receiving space 23 and returns to its original position.

Figure 11:
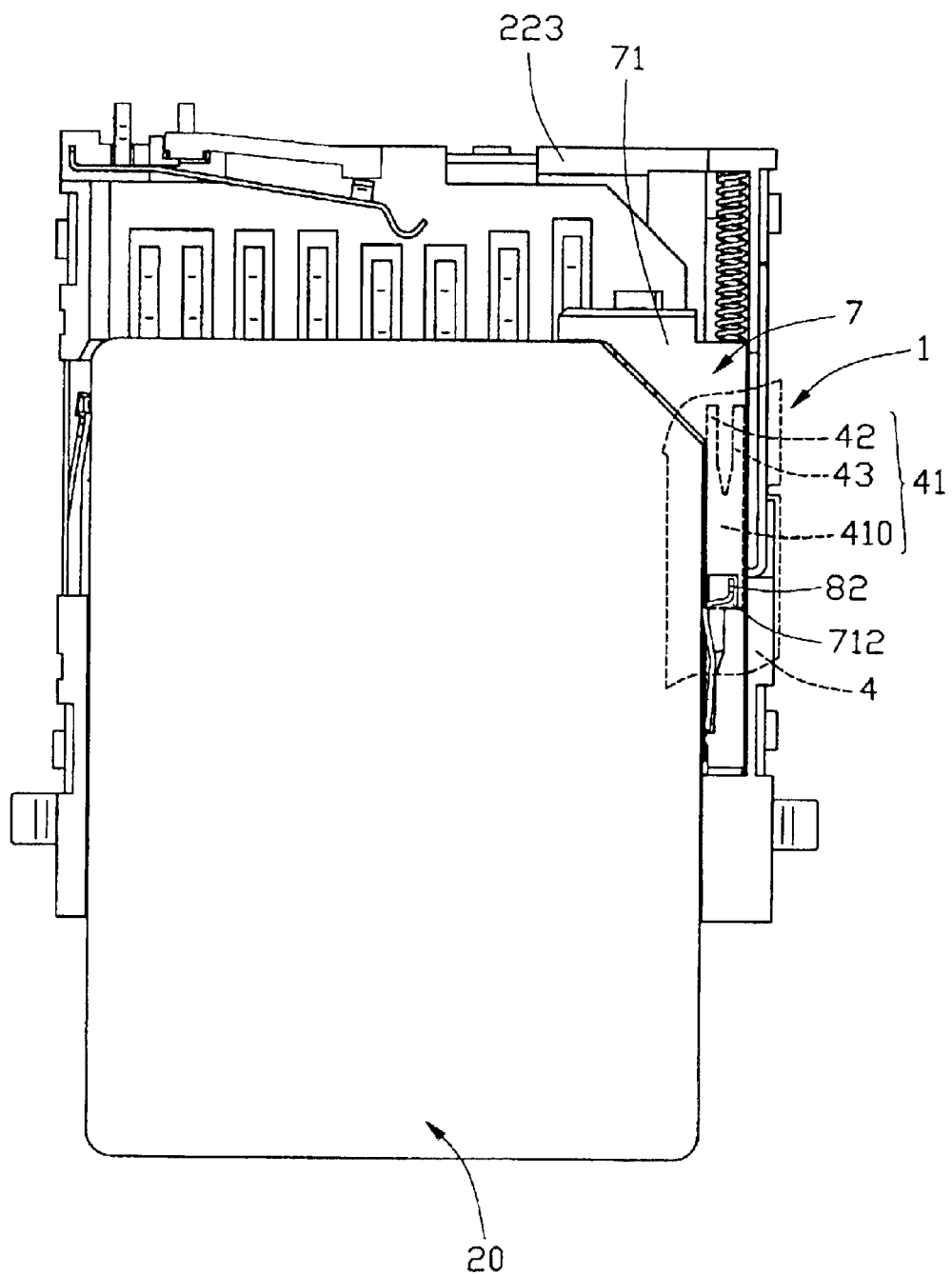
FIG. 11 is a view similar to FIG. 9, but with the one-stage thickness card without a notch partially inserted.
Figure 12:
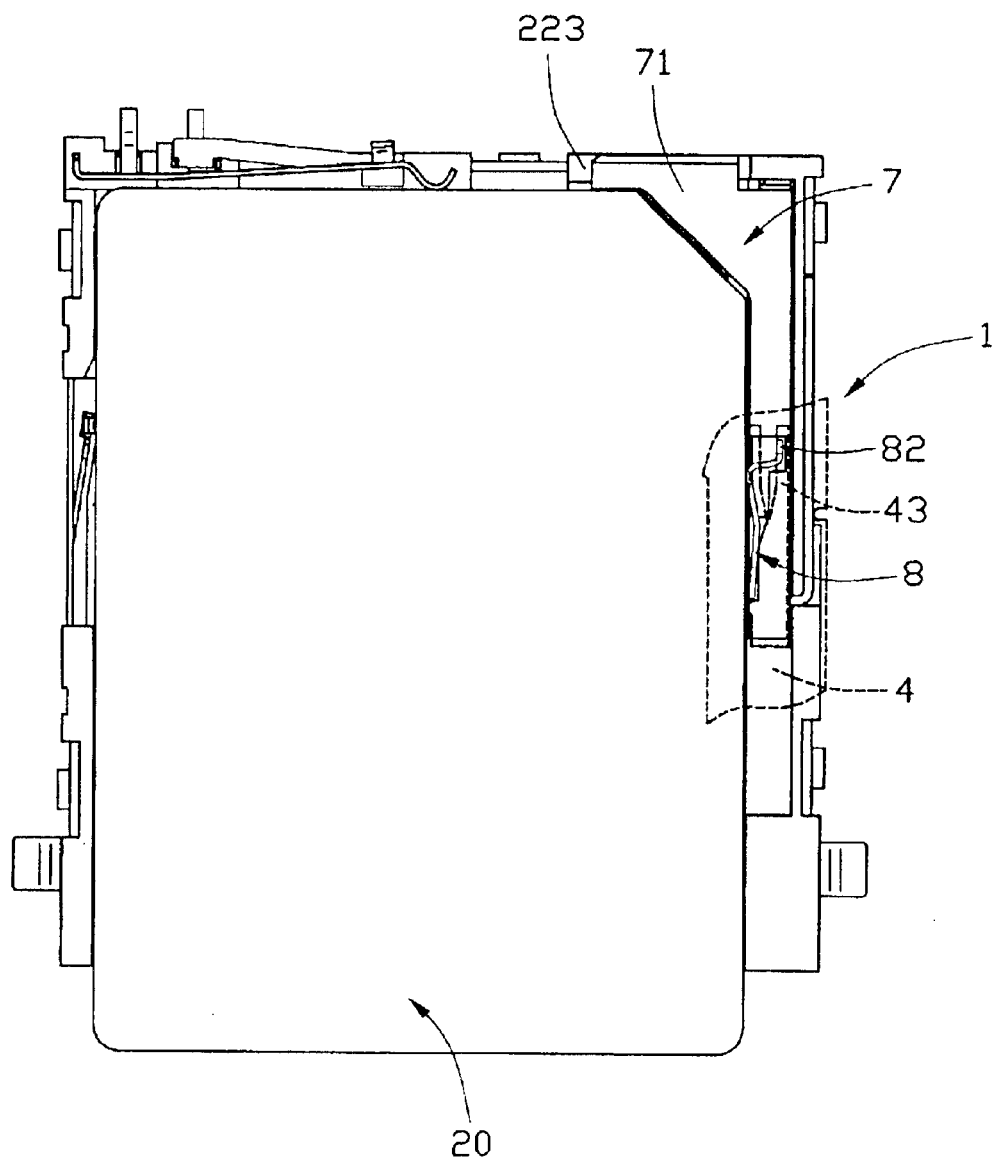
FIG. 12 is a view similar to FIG. 11, but with the one-stage thickness card fully inserted.

Referring to FIGS. 11 and 12, when the one-stage thickness card 20 is inserted, the eject member 71 is pushed toward the front rim 223 of the housing 2 by the front end of the card 20. At the same time, the elastic locking piece 8 is also moved toward the front rim 223 of the housing 2. Because the one-stage thickness card 20 is not formed with a notch 18 as the two-stage thickness card 10, the locking portion 83 of the elastic locking piece 8 is pressed outwardly into the receiving groove 712 with the protruding portion 82 displaced outwardly into the outer portion of the slot 410 adjacent to the second guide slit 43. As the elastic locking piece 8 is further moved to the front rim 223, the protruding portion 82 is displaced into the second guide slit 43. When the card 20 is fully inserted into the connector 1, the protruding portion 82 is restricted in a front end of the second guide slit 43 and the locking portion 83 abuts against a side wall of the card 20.

When the one-stage thickness card 20 is ejected, the elastic locking piece 8 is first moved rearwardly together with the card 20 with the locking portion 83 abutting against the side wall of the one-stage thickness card 20 and the protruding portion 82 moving along the second guide slit 43. The protruding portion 82 of the elastic locking piece 8 is then displaced into the slot 410 of the guide hole 41 and is thus free from the restriction of the second guide slit 43. As a result, the elastic locking piece 8 returns to its original position shown in FIG. 7.

When the one-stage thickness card 20 is inserted, the elastic locking piece 8 applies a sideward pressure to the card 20. Such a pressure ensures a reliable connection of the card 20 with the connector 1.

Figure 13:
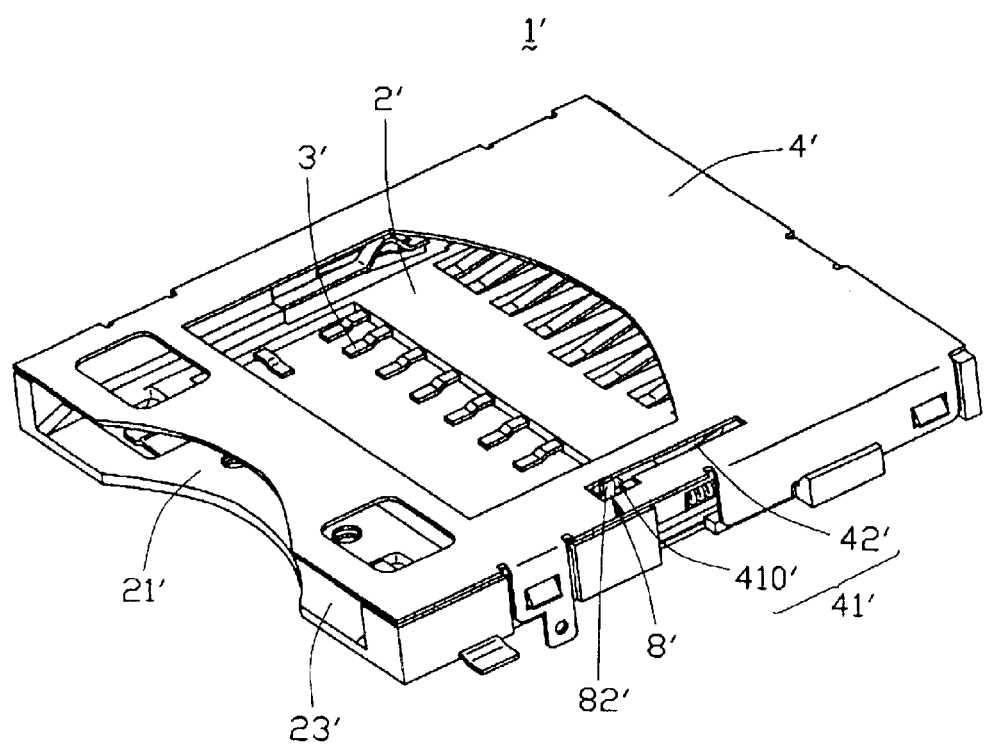
FIG. 13 is a perspective view of a card connector according to a second embodiment of the present invention.

Referring to FIG. 13, a card connector 1' according to a second embodiment of the present invention has a metal shell 4' defining a generally L-shaped guide hole 41' in a middle of a right side of an upper wall thereof. The guide hole 41' is used for guiding movement of a protruding portion 82' of an elastic locking piece 8' in response to the insertion of the card 10 into the connector 1'. The guide hole 41' includes a slot 410' defined in a rear portion thereof. The guide hole 41' further comprises a guide slit 42' forwardly and perpendicularly extending from the slot 410'. In this embodiment, other elements of the connector 1' have constructions similar to those of the first embodiment; thus, a detailed description thereof is omitted herefrom.

Figure 14:
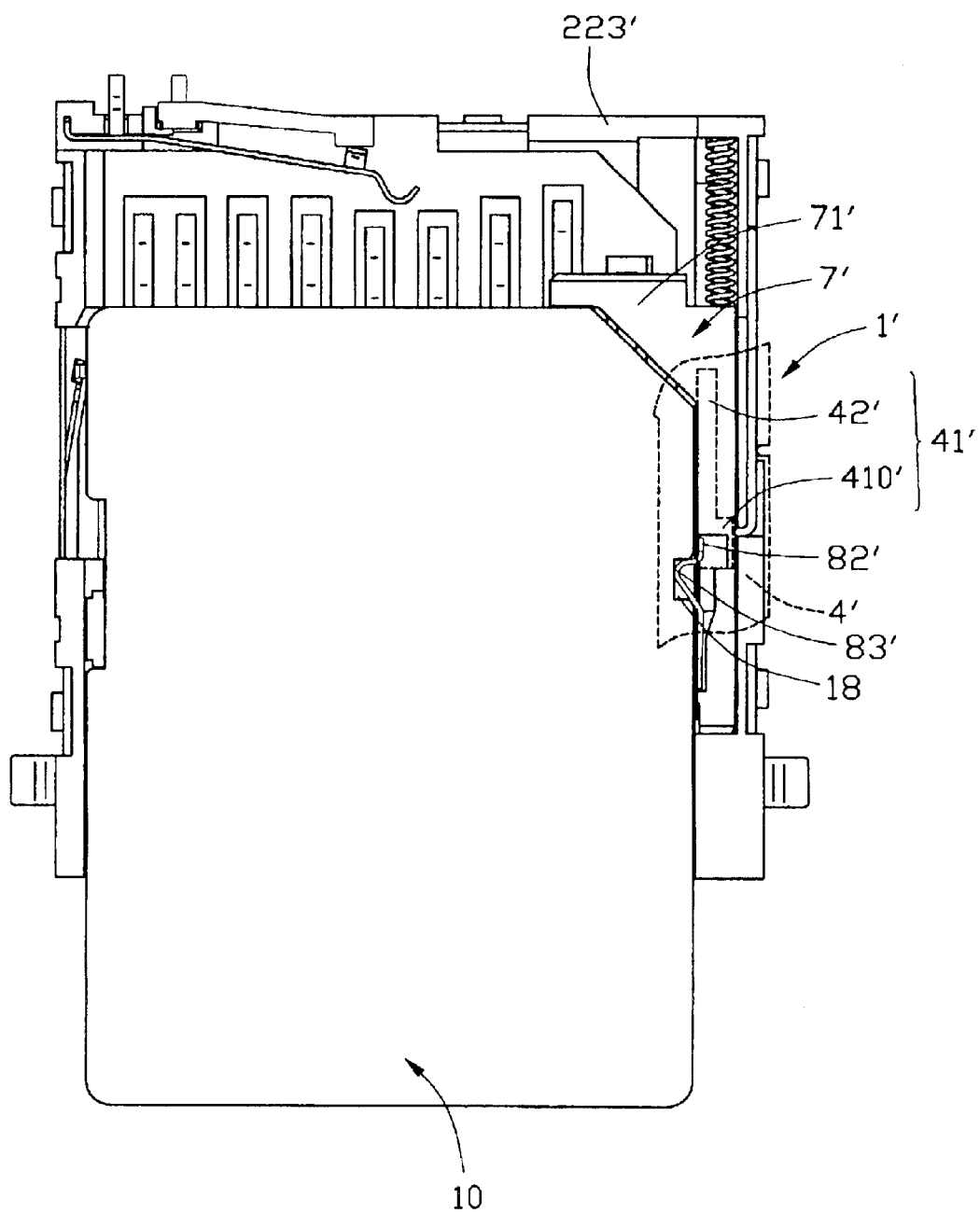
FIG. 14 is a top view illustrating the two-stage thickness card being inserted into the card connector shown in FIG. 13 with the notch thereof engaging with a locking portion of the card connector.

Referring to FIG. 14, when the two-stage thickness card 10 is inserted/ejected into/from the connector 1', the guide slit 42' functions for guiding movement of the protruding portion 82' of the elastic locking piece 8' after the notch 18 engages with a locking portion 83' of the elastic locking piece 8'. When the card 10 is fully inserted into the connector 1', the protruding portion 82' is restricted by the guide slit 42' of the guide hole 41' to keep the locking portion 83' engaging with the notch 18 of the card 10. Hence, the card 10 can be prevented from falling out due to unexpected external force, whereby a reliable electrical connection between the card 10 and the connector 1' is ensured.

Figure 15:
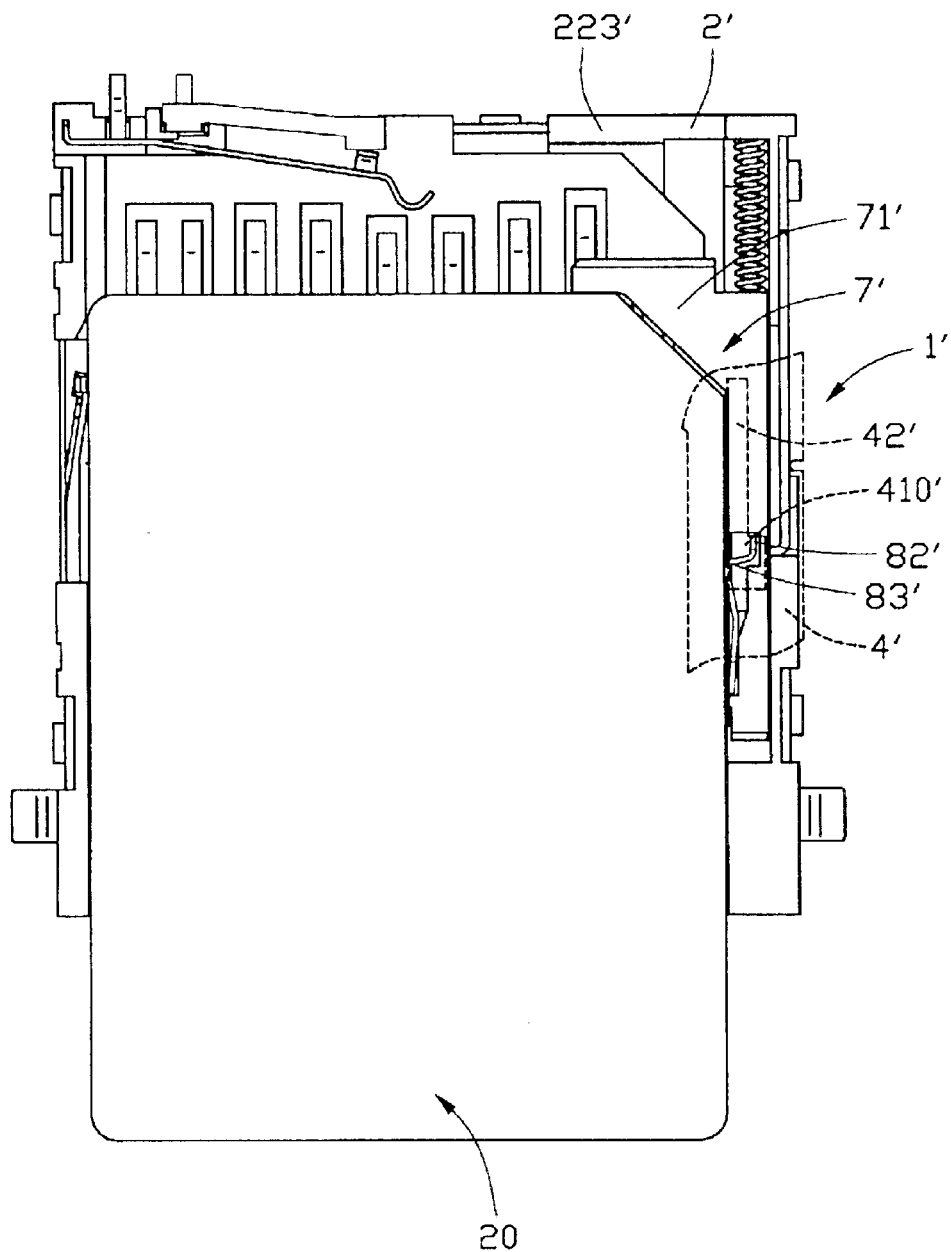
FIG. 15 is a top view illustrating the one-stage thickness card being prevented from further insertion into the card connector shown in FIG. 13.

Referring to FIG. 15, since the card 20 has no notch 18 as the two-stage thickness card 10, if the card 20 is inserted into the connector 1', the elastic locking piece 8' is biased outwardly by a side surface of the inserted card 20 with the protruding portion 82' displaced widthways of the housing 2' to an outer portion of the slot 410' far from the guide slit 42'. When the inserted card 20 tends to further push the eject member 71' with the elastic locking piece 8' toward the front rim 223' of the housing 2', the protruding portion 82' is restricted by a front edge of the slot 410' to prevent the card 20 from further moving forwardly. Similarly, since the card 10 defines the notch 18 only in one side, if the card 10 is inversely inserted into the connector 1', the protruding portion 82' is also restricted by the slot 410' to prevent the card 10 from further moving forwardly.

The guide hole 41' is so set in shape and size that it interferes with the displacement of the protruding portion 82' for preventing the one-stage thickness card 20 from inserting into the connector 1'. Therefore, the guide hole 41' of the connector 1' functions as both an anti-falling means and an anti-mismating means for the two-stage thickness card 10, and also an anti-insertion means for the one-stage thickness card 20. The card connector 1' only allows the two-stage thickness card 10 to be properly inserted therein.

In the above embodiments, the guide hole 41, 41' is defined in the metal shell 4, 4' disposed over the housing 2, 2' without increasing the profile of the card connector 1, 1' and without affecting the intensity of the housing 2, 2'. Therefore, the card connector 1, 1' of the present invention has a low profile and a relatively long life-span, and is also capable of reliably holding the inserted card.

It is noted that the advantages of the invention compared with the prior arts include (I) keeping low profile with minimum thickness while without jeopardizing the structural strength thereof, and (II) provision of vision indicator for the operator/user to know which type card, i.e., with or with the notch thereof, is used within the connector. It is because the protruding portion 82 is somewhat exposed, either physically or visionally, to the exterior on the top face of the connector, the viewer can identify the inserted card with the notch if the protruding portion 82 is located in the firs guide slit 42, or without the notch if the protruding portion 82 is located in the second guide slit 43.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector adapted for accepting a card having a notch in its side edge, the card connector comprising:

an insulative housing defining a card receiving space;

a plurality of contacts retained in the housing for electrically connecting with the card;

an eject mechanism mounted on the housing and having an eject member, the eject member being adapted to move in a card insertion direction as the card is inserted into the connector and to move in a card eject direction in response to a card eject operation to eject the card;

an elastic locking piece attached to the eject member and movable therewith, the elastic locking piece comprising a locking portion adapted to engage in the notch of the card, a stationary portion fixed in the eject member and a protruding portion projecting from the locking portion; and a metal shell substantially covering the housing and defining a guide hole accommodating and guiding the protruding portion of the elastic locking piece, the guide hole comprising a slot, a first guide slit communicating with the slot, and a second guide slit communicating with the slot;

wherein when the elastic locking piece is biased by the card before the locking portion engages with the notch during an earlier card insertion operation, the protruding portion is displaced in a first direction, and wherein when the locking portion engages with the notch during a later card insertion operation, the protruding portion moves in a second direction opposite to the first direction.

2. The card connector according to claim 1, wherein the locking portion of the elastic locking piece projects into the card receiving space when the card is not inserted into the connector.

3. The card connector according to claim 1, wherein the eject mechanism comprises a cam lever and a coil spring both supported by the eject member.

4. The card connector according to claim 3, wherein the eject member comprises a card abutment portion adapted to engage with a front portion of an inserted card, a heart cam and a lever guide groove for guiding displacement of an end of the cam lever as the eject member moves.

5. The card connector according to claim 4, wherein the stationary portion of the elastic locking piece is fixed in a section of the eject member distant from the card abutment portion.

6. The card connector according to claim 1, wherein the eject member of the eject mechanism defines a receiving groove communicating with the card receiving space, and wherein the elastic locking piece is biased into the receiving groove by the inserted card before the locking portion engages with the notch during the earlier card insertion operation.

7. The card connector according to claim 1, wherein the protruding portion of the elastic locking piece is displaced widthways of the housing within the slot when the locking portion engages with the notch of the card during the card insertion operation.

8. The card connector according to claim 1, wherein the protruding portion of the elastic locking piece is displaced lengthways of the housing within the first guide slit after the locking portion engages with the notch of the card as the eject member moves in the card insertion operation.

9. The card connector according to claim 1, wherein the protruding portion of the elastic locking piece is restricted by the first guide slit and the locking portion engages with the notch of the card when the card is fully inserted and electrically engages with the connects.

10. The card connector according to claim 1, wherein the second guide slit is substantially parallel to the first guide slit.

11. The card connector according to claim 10, wherein when a second card without the notch is inserted, the protruding portion of the elastic locking piece is first displaced widthways of the housing, and then the elastic locking piece is displaced lengthways of the housing with the protruding portion displaced into the second guide slit as the eject member moves in the card insertion direction.

12. A card connector adapted for selectively accepting a first card defining a notch and a second card without a notch, the card connector comprising:

an insulative housing defining a card receiving space;

a plurality of contacts retained in the housing for electrically connecting with the first card or the second card;

an eject mechanism mounted on the housing and having an eject member, the eject member being adapted to move in a card insertion direction as the first or the second card is inserted into the connector and to move in a card eject direction in response to a card ejection operation to eject the first or the second card;

an elastic locking piece attached to the eject member and movable therewith, the elastic locking piece comprising a locking portion adapted to engage in the notch of the first card or press against the second card, a stationary portion fixed in the eject member and a protruding portion projecting from the locking portion; and a metal shell substantially covering the housing and forming a guide portion guiding the displacement of the protruding portion, the guide portion comprising a first guide section and a second guide section;

wherein the guide portion is in the form of a hole defined through the metal shell, and the first and second guide sections are each in the form of a slit substantially parallel to each other;

wherein when the first card is inserted or ejected, the protruding portion is displaced in the first guide section, and wherein when the second card is inserted or ejected, the protruding portion is displaced in the second guide section.

13. An electronic card connector for use with electronic cards equipped with or without notches thereof, comprising:

an insulative housing defining a card receiving space therein;

a plurality of contacts disposed in the housing;

an eject mechanism slidably mounted on the housing and movable in a card insertion/removal direction;

a cover mounted on the housing and cooperating with the housing to define a vertical dimension of said card receiving space, said cover defining a guide hole with inner and outer slits communicating therewith; and an elastic locking piece mounted on and moved along with the eject mechanism, said locking piece including a locking portion extending in a lateral direction perpendicular to said insertion/removal direction and adapted to be engaged within the notch of the corresponding electronic card, and a protruding portion extending in a vertical direction perpendicular to both said insertion/removal direction and said lateral direction to be moveably received in said guide hole and the associated inner and outer slits and being able to be viewed from an exterior through said guide hole and the associated inner and outer slits; wherein when the electronic card equipped with the notch is inserted into the card receiving space and moved along with the eject mechanism in the insertion direction, the locking portion is received in the notch and the protruding portion essentially moves along an inner edge of the guide hole and reaches the inner slit;

when the electronic card equipped without the notch is inserted into the card receiving space and moved along with the eject mechanism in the insertion direction, the locking portion abuts against a side edge of said card and the protruding portion essentially moves along an outer edges of the guide hole and reaches the outer slit.

14. The electronic card connector according to claim 13, wherein the guide hole comprises a slot and a first guide slit communicating with the slot.

15. The electronic card connector according to claim 14, wherein the guide hole further comprises a second guide slit communicating with the slot and substantially parallel to the first guide slit.

16. The electronic card connector according to claim 15, wherein when a second card without the notch is inserted, the protruding portion of the elastic locking piece is first displaced widthways of the housing, and then the elastic locking piece is displaced lengthways of the housing with the protruding portion displaced into the second guide slit as the eject member moves in the card insertion direction.

17. A card connector adapted for accepting a card having a notch in its side edge, the card connector comprising:

an insulative housing defining a card receiving space;

a plurality of contacts retained in the housing for electrically connecting with the card;

an eject mechanism mounted on the housing and having an eject member, the eject member being adapted to move in a card insertion direction as the card is inserted into the connector and to move in a card eject direction in response to a card eject operation to eject the card;

an elastic locking piece attached to the eject member and movable therewith, the elastic locking piece comprising a locking portion adapted to engage in the notch of the card, a stationary portion fixed in the eject member and a protruding portion projecting from the locking portion; and a metal shell substantially covering the housing and defining a guide hole accommodating and guiding the protruding portion of the elastic locking piece;

wherein when the elastic locking piece is biased by the card before the locking portion engages with the notch during an earlier card insertion operation, the protruding portion is displaced in a first direction, and wherein when the locking portion engages with the notch during a later card insertion operation, the protruding portion moves in a second direction opposite to the first direction;

wherein the eject mechanism comprises a cam lever and a coil spring both supported by the eject member.

* * * * *